US012762951B2

(12) United States Patent
Park

(10) Patent No.: US 12,762,951 B2
(45) Date of Patent: Oct. 13, 2026

(54) METHOD AND APPARATUS FOR REMOTELY CONTROLLING A VEHICLE IN A PARKING LOT

(71) Applicants: HYUNDAI MOTOR COMPANY, Seoul (KR); KIA CORPORATION, Seoul (KR)

(72) Inventor: Se Young Park, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 5 days.

(21) Appl. No.: 18/980,654

(22) Filed: Dec. 13, 2024

(65) Prior Publication Data

US 2025/0299576 A1 Sep. 25, 2025

(30) Foreign Application Priority Data

Mar. 21, 2024 (KR) ........................ 10-2024-0039078

(51) Int. Cl.
*G08G 1/0967* (2006.01)
*B60W 60/00* (2020.01)
*G08G 1/017* (2006.01)

(52) U.S. Cl.
CPC ..... *G08G 1/096725* (2013.01); *B60W 60/001* (2020.02); *G08G 1/017* (2013.01); *G08G 1/096775* (2013.01); *B60W 2554/4049* (2020.02); *B60W 2556/45* (2020.02)

(58) Field of Classification Search
CPC ...... G08G 1/017; G08G 1/087; G08G 1/0962; G08G 1/096725; G08G 1/096775; G08G 1/143; G08G 1/146; B60W 60/001; B60W 2554/4049; B60W 2556/45; B62D 15/0285
See application file for complete search history.

(56) References Cited

U.S. PATENT DOCUMENTS

| | | | | |
|---|---|---|---|---|
| 2002/0109611 | A1* | 8/2002 | Howard | G07F 17/246 340/932.2 |
| 2004/0163325 | A1* | 8/2004 | Parrini | B66B 5/025 52/741.1 |
| 2021/0110683 | A1* | 4/2021 | Guan | G01C 21/206 |
| 2023/0211804 | A1* | 7/2023 | Koyama | B60W 60/0015 701/23 |
| 2023/0419834 | A1* | 12/2023 | Chiba | G08G 1/143 |
| 2025/0216859 | A1* | 7/2025 | Buerkle | G05D 1/617 |

* cited by examiner

*Primary Examiner* — Aaron L Troost
(74) *Attorney, Agent, or Firm* — Lempia Summerfield Katz LLC

(57) ABSTRACT

A method and an apparatus is for remotely controlling vehicles in a parking lot. A method for remotely controlling vehicles includes: classifying vehicles in a parking lot into a plurality of groups based on information about the parking lot; designating, among the plurality of groups, at least one group where an emergency situation occurs as a first group based on the emergency situation and the information about the parking lot, assigning priorities to the plurality of groups based on information of the first group; and transmitting control information to the vehicles using the priorities.

13 Claims, 6 Drawing Sheets

METHOD AND APPARATUS FOR REMOTELY CONTROLLING A VEHICLE IN A PARKING LOT

CROSS-REFERENCE TO RELATED APPLICATIONS

This application claims the benefit of and priority to Korean Patent Application No. 10-2024-0039078, filed on Mar. 21, 2024, which application is hereby incorporated herein by reference.

TECHNICAL FIELD

The present disclosure relates to a method, apparatus and system for remotely controlling vehicles in a parking lot. More specifically, the present disclosure relates to a method and apparatus for remotely controlling vehicles by designating groups of vehicles in a parking lot.

BACKGROUND

The contents described below merely provide background information related to the present disclosure and do not constitute prior art.

The future automobile market is evolving based on the connectivity between drivers and cars, between cars and their surroundings, and between transportation infrastructure and daily life elements, and research and development related to autonomous vehicles is in progress. In particular, various studies are being conducted on technologies, such as parking robot systems and AVPS (Automated Valet Parking System), which allow autonomous vehicles to automatically park in parking spaces by connecting parking lot infrastructure and the autonomous vehicles.

There are many social issues related to parking in modern society. In particular, if an emergency situation, such as an accident, fire, or flooding, occurs in a parking lot, massive human and material damage may occur because the parking lot is an enclosed space. Accordingly, in the event of an emergency situation in the parking lot, it is necessary to move the vehicles in the parking lot to a safe place.

SUMMARY

In view of the above, the present disclosure provides a method and apparatus for controlling vehicles by designating groups of vehicles in a parking lot when an emergency situation occurs in the parking lot.

In addition, according to one embodiment, the present disclosure provides a method and apparatus for controlling vehicles by giving priority to each group of vehicles in a parking lot based on distance and presence/absence of a driver when an emergency situation occurs in the parking lot.

The objects to be achieved by the present disclosure are not limited to the objects mentioned above, and other objects not mentioned should be more clearly understood by one of ordinary skill in the art from the description below.

According to at least one embodiment, the present disclosure provides a method for remotely controlling vehicles. The method includes: classifying vehicles in a parking lot into a plurality of groups based on information about the parking lot; designating, among the plurality of groups, at least one group where an emergency situation occurs as a first group based on the emergency situation and the information about the parking lot, assigning priorities to the plurality of groups based on information of the first groups; and transmitting control information to the vehicles using the priorities.

According to another embodiment, the present disclosure provides a remote vehicle control apparatus. The remote vehicle control apparatus includes: a management unit configured to, when an emergency situation occurs, transmit control information to vehicles in a parking lot to move the vehicles; and a database unit configured to store and manage information about the parking lot. The management unit includes: a group designation unit configured to classifying the vehicles in the parking lot using into a plurality of groups based on the information about the parking lot; and a priority assignment unit configured to, when the emergency situation occurs, designate, among the plurality of groups, at least one group where an emergency situation occurs as a first group based on the emergency situation and the information about the parking lot, and assign priorities to the plurality of groups based on information of the first group.

According to yet another embodiment, the present disclosure provides a computer-readable medium storing a computer program including computer-executable instructions. The computer-executable instruction causes, when executed by a computer, the computer to perform steps of: classifying vehicles in a parking lot into a plurality of groups based on information about the parking lot; designating, among the plurality of groups, at least one group where an emergency situation occurs as a first group based on the emergency situation and the information about the parking lot; assigning priorities to the plurality of groups based on information of the first groups; and transmitting control information to the vehicles using the priorities.

According to the present disclosure, when an emergency situation occurs in a parking lot, it is possible to efficiently control vehicles in the parking lot by designating a group of vehicles.

In addition, according to one embodiment, when an emergency situation occurs in a parking lot, it is possible to minimize human and material damage caused by the emergency situation by giving priority to each group of vehicles based on distance and presence/absence of a driver.

The effects of the present disclosure are not limited to the effects mentioned above, and other effects not mentioned should be more clearly understood by one of ordinary skill in the art from the following description.

Figure 1:
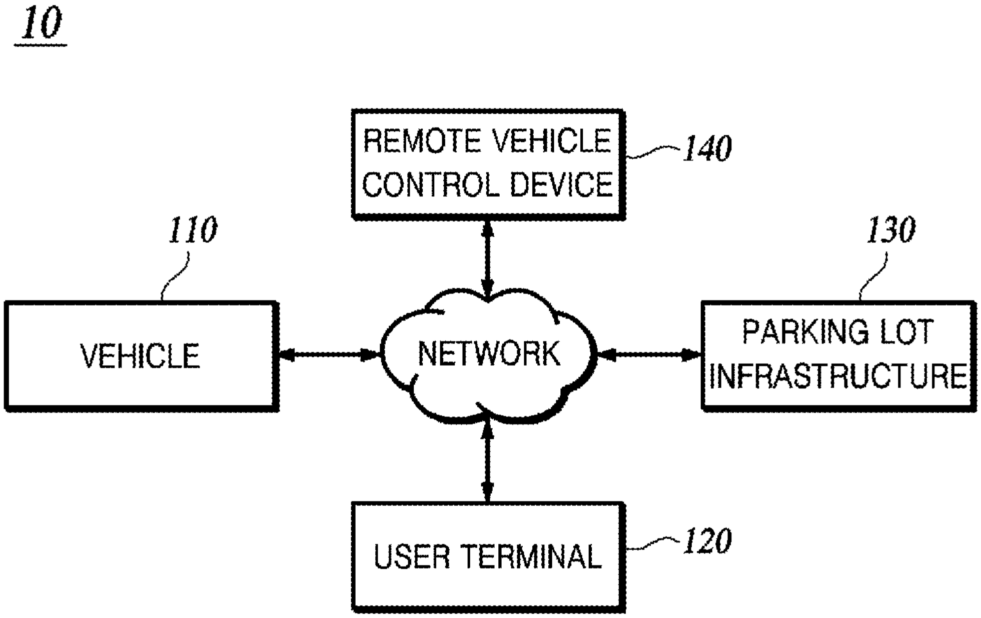
FIG. 1 is a block diagram illustrating a system for remotely controlling a vehicle, according to one embodiment of the present disclosure.

The drawings described herein are for illustration purposes only and are not intended to limit the scope of the present disclosure in any way.

DETAILED DESCRIPTION

Hereinafter, some embodiments of the present disclosure are described in detail with reference to the accompanying drawings. In the following description, like reference numerals designate like elements, although the elements are shown in different drawings. Further, in the following description of some embodiments, a detailed description of known functions and configurations incorporated therein has been omitted for the purpose of clarity and for brevity.

Additionally, various terms such as first, second, A, B, (a), (b), and the like, are used solely to differentiate one component from the other but not to imply or suggest the substances, order, or sequence of the components. Throughout this specification, when a part 'includes,' 'comprises,' or 'with' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof. The operations of the method or the functions described in connection with the forms disclosed herein may be embodied directly in a hardware or a software module executed by a processor, or in a combination thereof.

When a component, unit, module, controller, processor, device, element, apparatus, or the like of the present disclosure is described as having a purpose or performing an operation, function, or the like, the component, unit, module, controller, processor, device, element, apparatus, or the like should be considered herein as being "configured to" meet that purpose or to perform that operation or function.

In the present disclosure, each of phrases such as "A or B", "at least one of A and B", "at least one of A or B", "A, B or C", "at least one of A, B and C", "at least one of A, B or C" and "at least one of A, B, or C, or a combination thereof" may include any one or all possible combinations of the items listed together in the corresponding one of the phrases.

The following detailed description, together with the accompanying drawings, is intended to describe embodiments of the present disclosure, and is not intended to represent the only embodiments in which the present disclosure may be practiced.

FIG. 1 is a block diagram illustrating a system for remotely controlling a vehicle, according to one embodiment of the present disclosure.

Referring to FIG. 1, a system 10 for remotely controlling a vehicle includes all or some of a vehicle 110, a user terminal 120, a parking lot infrastructure 130, and a remote vehicle control apparatus 140. Not all blocks shown in FIG. 1 are essential elements, and some blocks may be changed or deleted, or other may be added.

The vehicle 110 may be a subject controlled by the remote vehicle control apparatus 140. The vehicle 110 may be a non-autonomous vehicle or a semi-autonomous vehicle that is not equipped with an autonomous driving function, but the present disclosure is not limited thereto. In another example, an autonomous vehicle may also be controlled by the remote vehicle control apparatus 140 to respond in the event of a system failure of the autonomous vehicle or for convenience of management.

The user terminal 120 may be a terminal used by an occupant of the vehicle 110. The terminal may be any one of a mobile phone, a smartphone, a laptop computer, a digital broadcasting terminal, a PDA (personal digital assistant), a PMP (portable multimedia player), a navigation device, a slate PC (personal computer), a tablet PC, an ultrabook, a wearable device (e.g., a smartwatch, a smart glass, and a head mounted display (HMD)), or the like, but the present disclosure is not limited to these examples.

The parking lot infrastructure 130 may be a system that can collect information about the parking lot. The information about the parking lot may include the identification number of the entering or exiting vehicle, the location of available parking spaces, the number of vehicles available for parking, the presence of an emergency situation in the parking lot, the parking area, the type of the parking lot, and the location of each vehicle in the parking lot. For this end, the parking lot infrastructure 130 may include one or more sensors. Depending on the implementation, the parking lot infrastructure 130 may further include a processor that recognizes the identification number of the vehicle or the location of an available parking space based on data output by one or more sensors, counts the number of vehicles that are currently parked or that can be additionally parked, and checks whether an emergency situation occurs and the location of each vehicle, but the present disclosure is not limited to this. In another embodiment, the functions described above may be performed by the remote vehicle control apparatus 140. The parking lot infrastructure 130 may transmit collected or processed information to the remote vehicle control apparatus 140 in real time.

The remote vehicle control apparatus 140 monitors the parking lot in real time using information transmitted from the parking lot infrastructure 130 and performs remote control of the vehicle 110. The remote vehicle control apparatus 140 may perform remote control to move the vehicle 110, which is stopped or parked in the parking lot, to another parking space, another parking lot, or outside. A detailed description of the remote vehicle control apparatus 140 is described below with reference to FIGS. 3-6.

Figure 2:
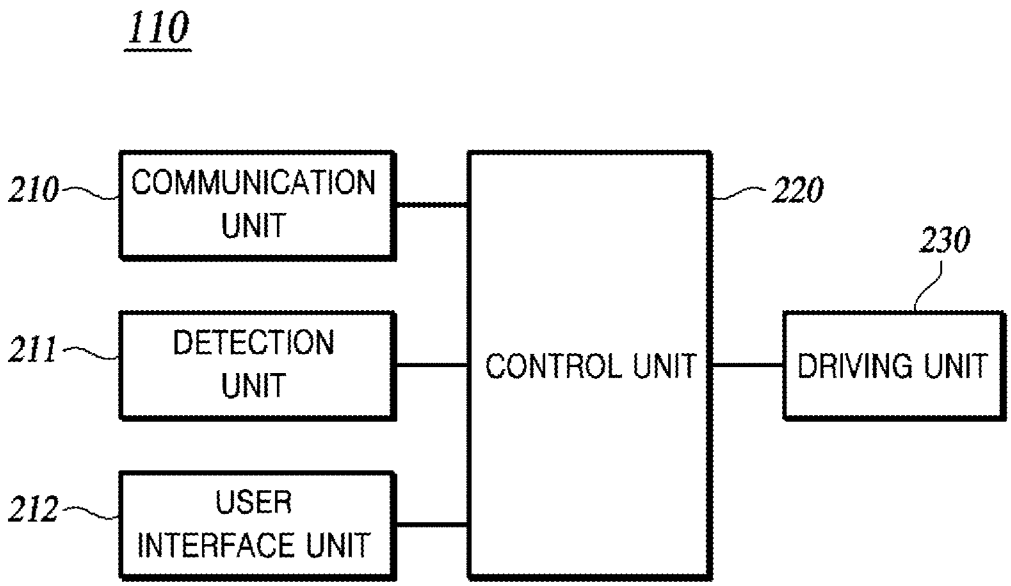
FIG. 2 is a block diagram illustrating a device mounted on a vehicle, according to one embodiment of the present disclosure.

FIG. 2 is a block diagram illustrating a device mounted on a vehicle, according to one embodiment of the present disclosure.

Referring to FIG. 2, the vehicle 110 may include all or some of a communication unit 210, a detection unit 211, a user interface unit 212, a control unit 220, and a driving unit 230. Not all blocks shown in FIG. 2 are essential components, and in other embodiments, some blocks included in the vehicle 110 may be added, changed, or deleted. The components shown in FIG. 2 represent functionally distinct elements, and at least one of the components may be implemented in an integrated form in an actual physical environment.

The communication unit 210 may transmit and receive information to and from the user terminal 120, the parking lot infrastructure 130, the remote vehicle control apparatus 140, and other objects using at least one of the following communication methods: LAN (Local Area Network) (e.g., Wireless LAN), Wi-Fi (Wireless-Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced).

The communication unit 210 may perform short-distance communication with the user terminal 120, the parking lot infrastructure 130, the remote vehicle control apparatus 140, and other objects. In this case, the communication unit 210 may transmit and receive various information to and from the user terminal 120, the parking lot infrastructure 130, the remote vehicle control apparatus 140, and other objects using Bluetooth, RFID (Radio Frequency Identification), Infrared Data Association (IrDA), UWB (Ultra WideBand), ZigBee, NFC (Near Field Communication), Wi-Fi (Wireless-Fidelity), Wi-Fi Direct, Wireless USB (Wireless Universal Serial Bus), and the like.

The detection unit 211 may include a RADAR (Radio Detection and Ranging), camera, LiDAR (Light Detection and Ranging), and the like. The detection unit 211 may detect the speed and position of surrounding vehicles and the speed and position of surrounding objects. The detection unit 211 may detect all objects, including obstacles, people, animals, toll booths, seawalls, and the like, in addition to vehicles. The detection unit 211 may further include a processor for detecting an external object or identifying a location where the external object is detected based on data output from one or more sensors, but is not limited thereto. In another embodiment, the above-described functions may be performed by the control unit 220.

The detection unit 211 may collect status information of the vehicle 110. In this case, the status information includes the rotation speed of a steering wheel of the vehicle 110, the rotation angle of the steering wheel, the operation status of acceleration and deceleration pedals, the operation status of a turn signal lamp, the operation status of a lighting device, the driving speed, acceleration, and rotational angular velocity of the vehicle 110, attitude of the vehicle 110, and/or GPS (Global Positioning System)-based location information. To this end, the detection unit 211 may include a GPS receiver, an inertial measurement unit (IMU), a vehicle speed sensor, an acceleration/deceleration pedal position sensor, and a steering sensor, but is not limited to the sensors described.

The user interface unit 212 provides a user interface to the driver. The user interface unit 212 receives information from the driver and transmits it to the control unit 220, or outputs results according to the operation. For example, the driver may input information about surrounding vehicles and surrounding objects into the user interface unit 212. The user interface unit 212 may transmit the information on surrounding vehicles and the information on surrounding objects to the control unit 220. The control unit 220 may issue a control command to the driving unit 230 using the information on surrounding vehicles and the information on surrounding objects.

The control unit 220 may process information obtained from various devices in the vehicle 110 or transmit it to another device. For example, the control unit 220 may process information collected using the detection unit 221. The control unit 220 may transmit the collected information or processed information to the communication unit 210. The control unit 220 can issue a control command to the driving unit 230 using control information received from the remote vehicle control apparatus 140 through the communication unit 210. The control unit 220 may be implemented as an embedded board. The control unit 220 may convert data formats when transferring information between components within a vehicle. For example, the control unit 220 may convert control information with a TCP (Transmission Control Protocol) communication format obtained from the communication unit 210 into a CAN (Controller Area Network) communication format.

The driving unit 230 may control the operations of various driving devices related to the behavior of the vehicle 110, such as steering, braking, and/or speed shifting of the vehicle 110. The driving unit 230 may include, for example, a braking controller, a speed shift controller, a steering controller, a lamp controller, and/or a door controller. The driving unit 230 may control the powertrain, steering device, brakes, turn signals, emergency lights, and/or doors, and the like based on control commands from the control unit 220. Since the method by which the driving unit 230 controls the operation of various devices related to the behavior of the vehicle 110 is common in the art, detailed description thereof has been omitted.

Figure 3:
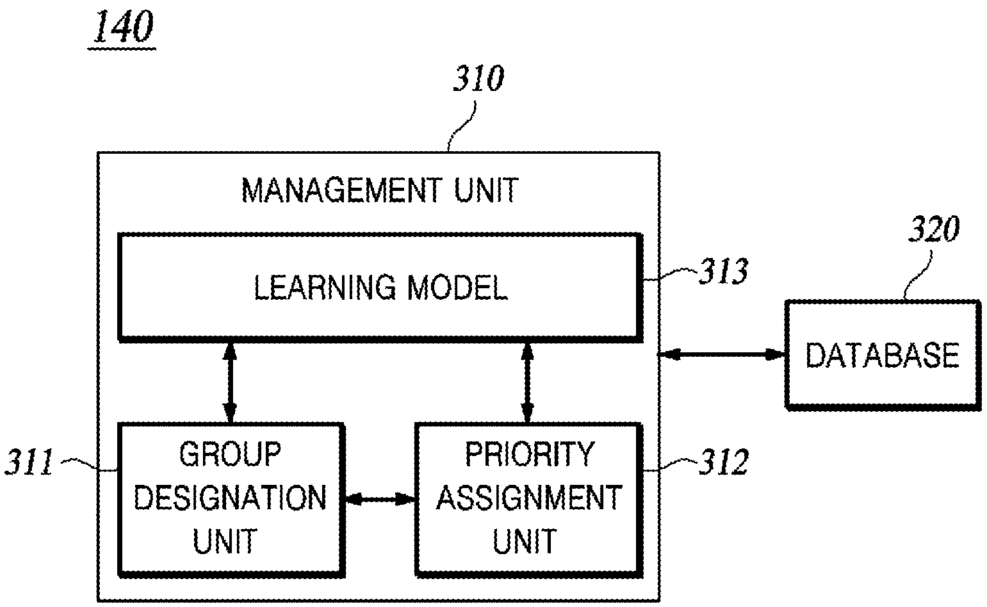
FIG. 3 is a block diagram illustrating a remote vehicle control apparatus according to one embodiment of the present disclosure.

FIG. 3 is a block diagram illustrating the remote vehicle control apparatus according to one embodiment of the present disclosure.

Referring to FIG. 3, the remote vehicle control apparatus 140 includes all or some of a management unit 310 and a database 320. Not all blocks shown in FIG. 3 are essential components, and in other embodiments, some blocks included in the remote vehicle control apparatus 140 may be added, changed, or deleted. The components shown in FIG. 3 represent functionally distinct elements, and at least one of the components may be implemented in an integrated form in an actual physical environment.

The management unit 310 manages vehicles in the parking lot and transmits control information for moving the vehicles to the vehicle 110. The management unit 310 uses information about the parking lot to determine whether an emergency situation has occurred in the parking lot. When an emergency situation occurs in the parking lot, the management unit 310 designates groups of vehicles, assigns priority to each group, and transmits control information to the vehicle 110 to move the vehicles to a safe place.

The database 320 stores and manages information about the parking lot. For example, the database 320 may store a detailed map of the parking lot. The database 320 may collect information about the parking lot from the parking lot infrastructure 130 in real time. Accordingly, the database 320 may store information on identification numbers of entering or exiting vehicles, locations of available parking spaces, the number of vehicles available for parking, whether an emergency situation occurs in the parking lot, the location of each vehicle in the parking lot, and the like.

The management unit 310 includes a group designation unit 311, a priority assignment unit 312, and a learning model 313. The group designation unit 311 may designate a group of vehicles in the parking lot using information about the parking lot. For example, the group designation unit 311 may designate four vehicles as one group using the locations of the parked vehicles. The group designation unit 311 may designate a group of vehicles in the parking lot before an emergency situation occurs. The group designation unit 311 may integrate a specific group of vehicles with another group in the event of an emergency.

The group designation unit 311 may designate a group of vehicles in the parking lot using the autonomous driving level of the vehicles. The group designation unit 311 may transfer vehicles that can drive normally within the group in which an emergency situation occurs to another group. The group designation unit 311 may regroup only normal vehicles in the group in which an emergency situation occurs by excluding only vehicles with problems in the group in which an emergency situation occurs. When an emergency situation occurs, the group designation unit 311 may terminate the service of a vehicle providing delivery service in the parking lot and designate a group to which the vehicle is to belong.

The priority assignment unit 312 assigns priority to each group based on distance or presence/absence of the driver in the vehicle. The priority assignment unit 312 may determine a group in which an emergency situation occurs among groups of vehicles using information about the parking lot. The priority assignment unit 312 may assign priority to each group using the distance between the group in which an emergency situation occurs and other groups. The priority assignment unit 312 may assign priority to each group using the floor of the parking lot where an emergency situation occurs.

For example, the priority assignment unit 312 may assign the highest priority to groups on the floor where an emergency situation occurs. In addition, the priority assignment unit 312 may assign the second priority to groups located on floors surrounding the floor where an emergency situation occurs. In the case of upper and lower floors of the floor where an emergency situation occurs, the priority assignment unit 312 may assign higher priority to groups on the lower floor than groups on the upper floor. For example, if an emergency occurs on the 4th floor of the parking lot, the priority assignment unit 312 may assign priority to groups on the 4th floor, groups on the 3rd floor, and groups on the 5th floor in that order.

The learning model 313 may be a trained learning model. The learning model 313 may correspond to a deep learning-based model. The management unit 310 may further include a learning unit (not shown) for pre-training the learning model 313. The learning unit may pre-train the learning model 313 using supervised learning, unsupervised learning, semi-supervised learning, and/or reinforcement learning. In this case, the specific method by which the learning unit trains the learning model 313 using learning data is common in the art, and detailed description thereof has been omitted.

The group designation unit 311 may designate a group of vehicles using the learning model 313. The priority assignment unit 312 may assign priorities to the groups using the learning model 313. The management unit 310 may transmit control information for moving vehicles to a safe place in the parking lot to each vehicle 110 using the vehicle groups and priorities for each group. For example, the safe place may be a nearby parking lot, a nearby shoulder, a nearby road, and another floor of the same building. The control information may include information on the order of movement of vehicles belonging to groups on floors where an emergency situation occurs, the order of movement of vehicles belonging to groups on the floor where no emergency situation occurs, the location where each vehicle is to be moved, and the driving scenario of each vehicle.

If it is not possible to control all vehicles in the parking lot, the remote vehicle control apparatus 140 may first transmit control information to vehicles belonging to a high priority group. Even if a driver is in a vehicle and the driver is driving the vehicle, the corresponding vehicle may move using control information received from the remote vehicle control apparatus 140. If an emergency situation occurs and it is more efficient for the driver to drive the vehicle, the remote vehicle control apparatus 140 may not transmit control information to the vehicle. The remote vehicle control apparatus 140 may preferentially transmit control information to normal vehicles in the group in which an emergency situation occurs.

Figure 4:
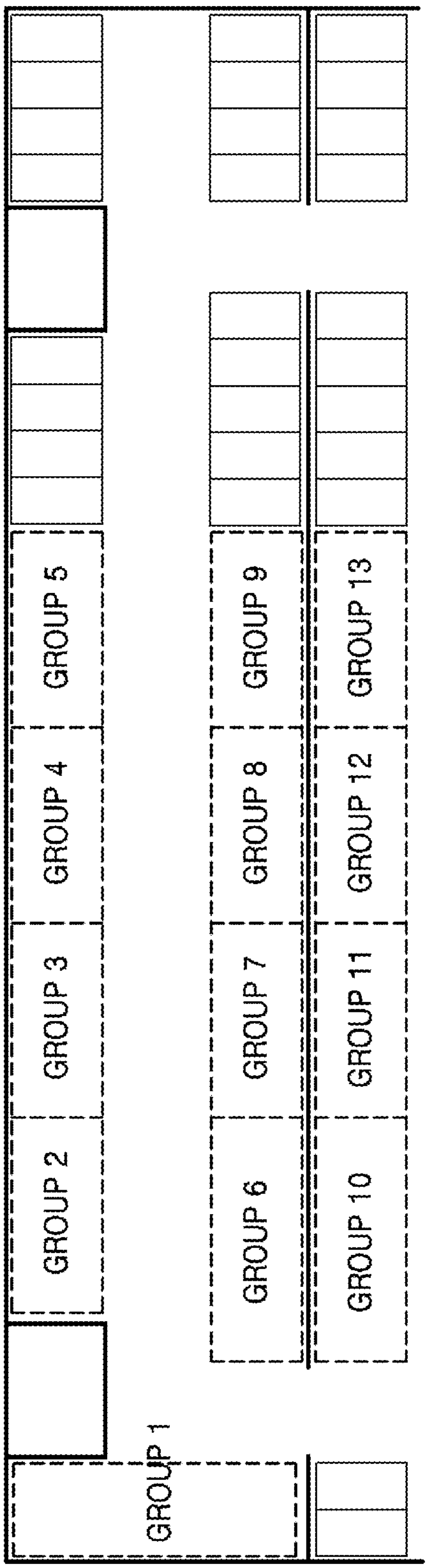
FIG. 4 is a diagram for explaining a method of designating a group of vehicles in a parking lot, according to one embodiment of the present disclosure.

FIG. 4 is a diagram for explaining a method of designating a group of vehicles in a parking lot, according to one embodiment of the present disclosure.

Referring to FIG. 4, the group designation unit 311 may designate a group of vehicles using information about the parking lot. The group designation unit 311 may designate vehicles parked in the upper left corner of the parking lot to Group 1. The group designation unit 311 may designate vehicles parked sequentially from the right of Group 1 to Groups 2 to 5. The group designation unit 311 may designate vehicles parked at the lower side of Groups 2 to 5 to Groups 6 to 9. The group designation unit 311 may designate vehicles parked at the lower side of Groups 6 to 9 to Groups 10 to 13. The group designation unit 311 may designate four or five vehicles to one group.

Figure 5:
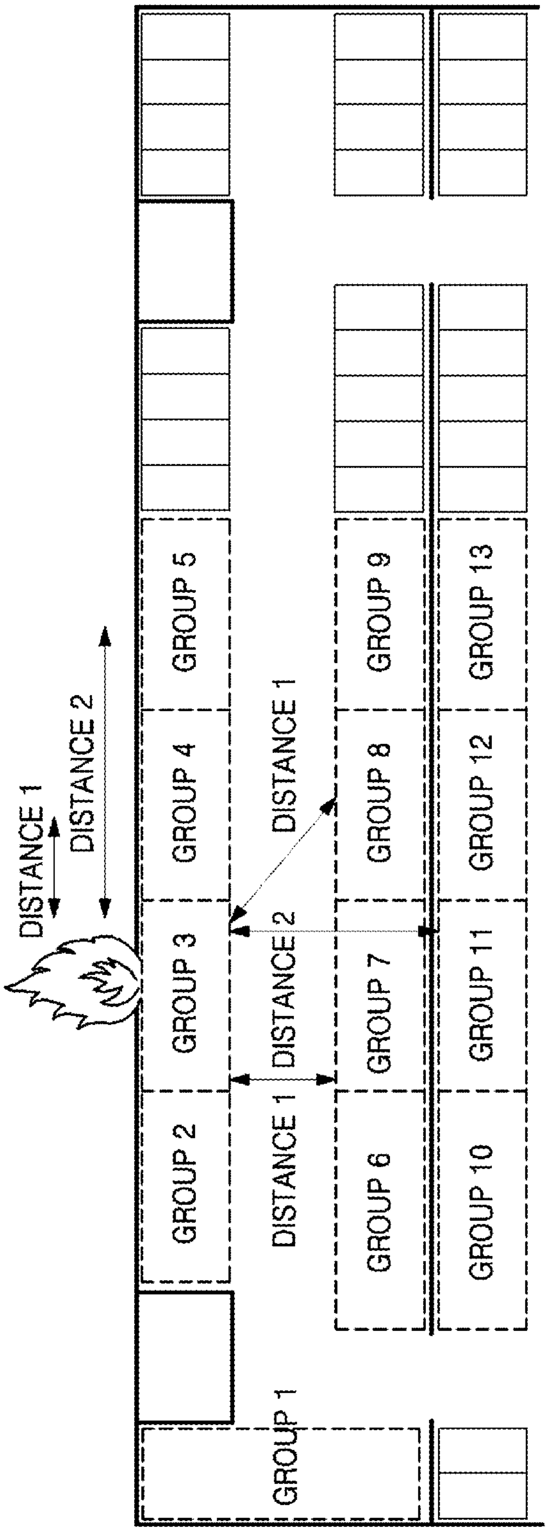
FIG. 5 is a diagram for explaining a method of assigning priorities to groups of vehicles according to one embodiment of the present disclosure.

FIG. 5 is a diagram for explaining a method of assigning priorities to groups of vehicles according to one embodiment of the present disclosure.

Referring to FIG. 5, the priority assignment unit 312 may assign priorities to groups of vehicles in FIG. 4. The priority assignment unit 312 may determine that Group 3 is the group in which an emergency situation occurs using information about the parking lot. The priority assignment unit 312 may assign priority to each group using the distance between Group 3 and other groups. For example, since the groups that are spaced apart from Group 3 by a distance 1 are Group 4, Group 7, and Group 8, the priority assignment unit 312 may assign the first priority to Group 4, Group 7, and Group 8. Since the groups that are spaced apart from Group 3 by a distance 2 are Group 5 and Group 11, the priority assignment unit 312 may assign the second priority to Group 5 and Group 11.

The priority assignment unit 312 may assign priority to each group by additionally considering whether a driver is in a vehicle in addition to the distance between Group 3 and other groups. For example, when a driver is in a vehicle belonging to Group 5, the priority assignment unit 312 may assign the first priority to Group 4, Group 7, and Group 8, assign the second priority to Group 5, and assign the third priority to Group 11. In another embodiment, when a driver is in a vehicle belonging to Group 5, the priority assignment unit 312 may assign the first priority to Group 5, assign the second priority to Group 4, Group 7, and Group 8, and assign the third priority to Group 11. The management unit 310 may transmit control information to each vehicle to move the vehicles belonging to each group to a safe place using the priorities assigned to the respective groups. Each vehicle may move to the safe place using the received control information.

Figure 6:
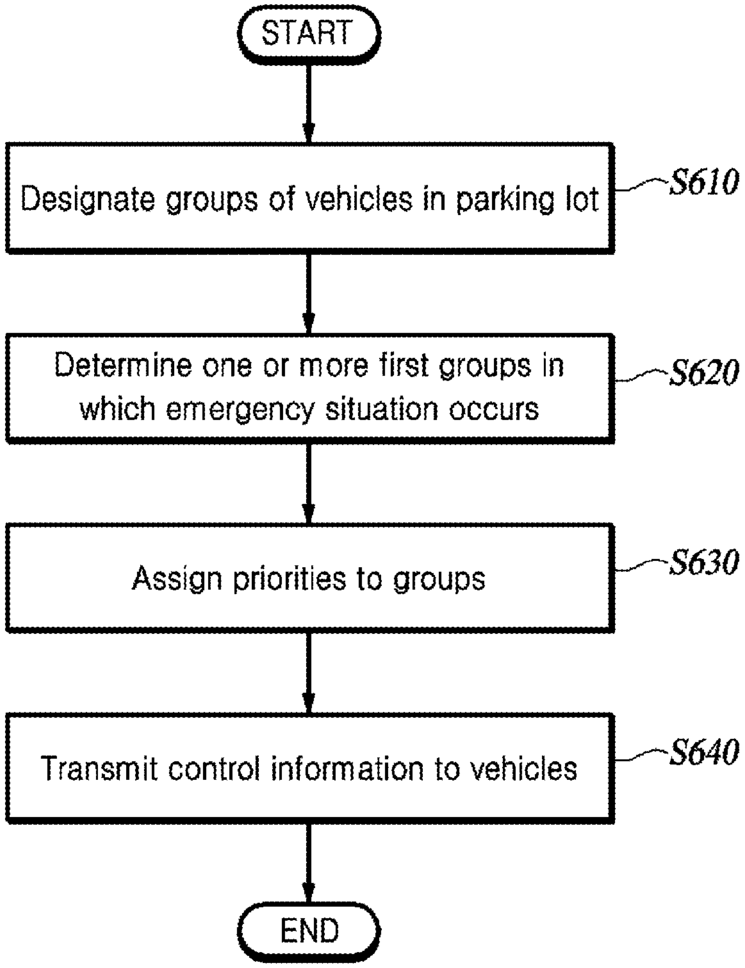
FIG. 6 is a flowchart illustrating a method of remotely controlling vehicles in a parking lot, according to one embodiment of the present disclosure.

FIG. 6 is a flowchart illustrating a method of remotely controlling vehicles in a parking lot, according to one embodiment of the present disclosure.

Referring to FIG. 6, the group designation unit 311 designates groups of vehicles in the parking lot using information about the parking lot (an operation S610). In other words, the group designation unit 311 may classify the vehicles in the parking lot into a plurality of groups based on the information about the parking lot. The information about the parking lot may include information about identification numbers of vehicles in the parking lot, information about the locations of available parking spaces, information about the number of vehicles available for parking, information about whether an emergency situation occurs in the parking lot, information about the parking area, information about the type of parking lot, and information about the location of each vehicle in the parking lot. The process of designating groups of vehicles may include designating groups of vehicles using the autonomous driving levels of the vehicles. For example, the process of classifying the vehicles in the parking lot into the plurality of groups may include classifying the vehicles in the parking lot into the plurality of groups based on the autonomous driving levels of the vehicles)

When an emergency situation occurs, the priority assignment unit 312 determines one or more first groups in which the emergency situation occurs among the groups using information about the parking lot (an operation S620). In other words, the priority assignment unit 312 may designating, among the plurality of groups, at least one group where an emergency situation occurs as a first group based on the emergency situation and the information about the parking lot. The process of determining one or more first groups may include designating vehicles other than the vehicle with a problem in the one or more first groups to belong to another group. In other words, the priority assignment unit 312 may reclassify one or more vehicles in the first group other than a vehicle with a problem to another group. For example, the priority assignment unit 312 may reclassify one or more vehicles capable of normal driving in the first group to another group. The priority assignment unit 312 assigns priorities to groups using the one or more first groups (an operation S630). The process of assigning priorities to groups may include assigning priorities to groups using at least one of the distance between the one or more first groups and other groups and whether the vehicles are occupied by drivers. The process of assigning priorities to groups may include assigning priorities to groups by floor using the floor in the parking lot to which the one or more first groups belong.

The management unit 310 transmits control information to vehicles using priorities (an operation S640). The control information may include information about the order of movement of vehicles belonging to groups on the floor where an emergency situation occurs, information about the order of movement of vehicles belonging to groups on floors where no emergency situation occurs, information about a place where each vehicle is to move, and information about a driving scenario of each vehicle.

Each element of the apparatus or method in accordance with the present disclosure may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a compact disc ROM (CD-ROM), magnetic tape, a floppy disk, a memory card, a hard disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an description of the technical idea of one embodiment of the present disclosure. In other words, those having ordinary skill in the art to which one embodiment of the present disclosure belongs may appreciate that various modifications and changes can be made without departing from essential features of an embodiment of the present disclosure. In other words, the sequence illustrated in the flowcharts/timing charts can be changed and one or more operations of the operations can be performed in parallel. Thus, flowcharts/timing charts are not limited to the temporal order.

Although embodiments of the present disclosure have been described for illustrative purposes, those having ordinary skill in the art should appreciate that various modifications, additions, and substitutions are possible, without departing from the idea and scope of the claims. Therefore, embodiments of the present disclosure have been described for the sake of brevity and clarity. The scope of the technical idea of the present embodiments is not limited by the illustrations. Accordingly, one of ordinary skill would understand that the scope of the claims is not to be limited by the above explicitly described embodiments but by the claims and equivalents thereof.

What is claimed is:

1. A method performed by a remote vehicle control apparatus, the method comprising:

classifying vehicles in a parking lot into a plurality of groups based on information about the parking lot;

designating, among the plurality of groups, at least one first group where an emergency situation occurs based on the information about the parking lot;

assigning priorities to the plurality of groups based on information about the at least one first group; and generating and transmitting control information to the vehicles using the priorities, wherein the control information is generated based on information about the parking lot including locations of the vehicles, wherein the control information includes information about an order of movement of vehicles belonging to groups on a floor where the emergency situation occurs, information about an order of movement of vehicles belonging to groups on floors where no emergency situation occurs, information about a place where each vehicle is to move, and information about a driving scenario of each vehicle, and wherein the control information is used by at least one of the vehicles to control movement of the at least one of the vehicles.

2. The method of claim 1, wherein the information about the parking lot includes information about identification numbers of the vehicles in the parking lot, information about locations of available parking spaces, information about a number of vehicles available for parking, information about whether the emergency situation occurs in the parking lot, information about a parking area, information about a type of the parking lot, and information about a location of each vehicle in the parking lot.

3. The method of claim 1, wherein classifying the vehicles in the parking lot into the plurality of groups comprises:

classifying the vehicles in the parking lot into the plurality of groups based on autonomous driving levels of the vehicles.

4. The method of claim 1, wherein designating, among the plurality of groups, the at least one first group comprises:

reclassifying one or more vehicles in the at least one first group other than a vehicle with a problem to another group.

5. The method of claim 1, wherein assigning the priorities to the plurality of groups comprises:

assigning the priorities to the plurality of groups based on at least one of a distance between the at least one first group and other groups or whether the vehicles are occupied by drivers.

6. The method of claim 1, wherein assigning the priorities to the plurality of groups comprises:

assigning floor priorities to each floor based on a floor in the parking lot to which the at least one first group belongs.

7. A remote vehicle control apparatus comprising:

a processor; and a memory configured to store instructions and information about a parking lot, wherein the processor is configured to execute the instructions to:

classify vehicles in the parking lot into a plurality of groups based on the information about the parking lot;

designate, among the plurality of groups, at least one first group where an emergency situation occurs based on the information about the parking lot;

assign priorities to the plurality of groups based on information about the at least one first group; and generate and transmit control information to the vehicles using the priorities, wherein the processor is configured to generate the control information based on information about the parking lot including locations of the vehicles wherein the control information includes information about an order of movement of vehicles belonging to groups on a floor where the emergency situation occurs, information about an order of movement of vehicles belonging to groups on floors where no emergency situation occurs, information about a place where each vehicle is to move, and information about a driving scenario of each vehicle, and wherein the control information is used by at least one of the vehicles to control movement of the at least one of the vehicles.

8. The remote vehicle control apparatus of claim 7, wherein the information about the parking lot includes information about identification numbers of the vehicles in the parking lot, information about locations of available parking spaces, information about a number of vehicles available for parking, information about whether the emergency situation occurs in the parking lot, information about a parking area, information about a type of the parking lot, and information about a location of each vehicle in the parking lot.

9. The remote vehicle control apparatus of claim 7, wherein the processor is configured to classify the vehicles in the parking lot into the plurality of groups based on autonomous driving levels of the vehicles.

10. The remote vehicle control apparatus of claim 7, wherein the processor is configured to reclassify one or more vehicles in the at least one first group other than a vehicle with a problem to another group.

11. The remote vehicle control apparatus of claim 7, wherein the processor is configured to assign the priorities to the plurality of groups based on at least one of a distance between the at least one first group and other groups or whether the vehicles are occupied by drivers.

12. The remote vehicle control apparatus of claim 7, wherein the processor is configured to assign floor priorities to each floor based on a floor in the parking lot to which the at least one first group belongs.

13. A non-transitory computer-readable recording medium storing instructions, wherein the instructions, when executed by a computer, cause the computer to perform:

classifying vehicles in a parking lot into a plurality of groups based on information about the parking lot;

designating, among the plurality of groups, at least one first group where an emergency situation occurs based on the information about the parking lot;

assigning priorities to the plurality of groups based on information about the at least one first group; and generating and transmitting control information to the vehicles using the priorities wherein the control information is generated based on information about the parking lot including locations of the vehicles, wherein the control information includes information about an order of movement of vehicles belonging to groups on a floor where the emergency situation occurs, information about an order of movement of vehicles belonging to groups on floors where no emergency situation occurs, information about a place where each vehicle is to move, and information about a driving scenario of each vehicle, and wherein the control information is used by at least one of the vehicles to control movement of the at least one of the vehicles.

* * * * *